United States Patent [19]
Brasie

[11] 3,827,676
[45] Aug. 6, 1974

[54] INTERFACIAL SURFACE GENERATOR
[75] Inventor: William C. Brasie, Midland, Mich.
[73] Assignee: The Dow Chemical Company, Midland, Mich.
[22] Filed: Oct. 2, 1972
[21] Appl. No.: 293,826

[52] U.S. Cl. ................................................. 259/4
[51] Int. Cl. ............................................. B01f 15/00
[58] Field of Search ............... 259/4, 18, 36; 138/38

[56] References Cited
UNITED STATES PATENTS
2,802,648   8/1957   Christensen ........................... 259/4
3,190,618   6/1965   Katzen .................................. 259/4
3,406,947   10/1968  Harder .................................. 259/4

*Primary Examiner*—Robert W. Jenkins
*Attorney, Agent, or Firm*—R. B. Ingraham

[57] ABSTRACT

An interfacial surface generator is shown having a jointed central support means which facilitates its insertion in conduits where limited room is available.

3 Claims, 3 Drawing Figures

PATENTED AUG 6 1974  3,827,676
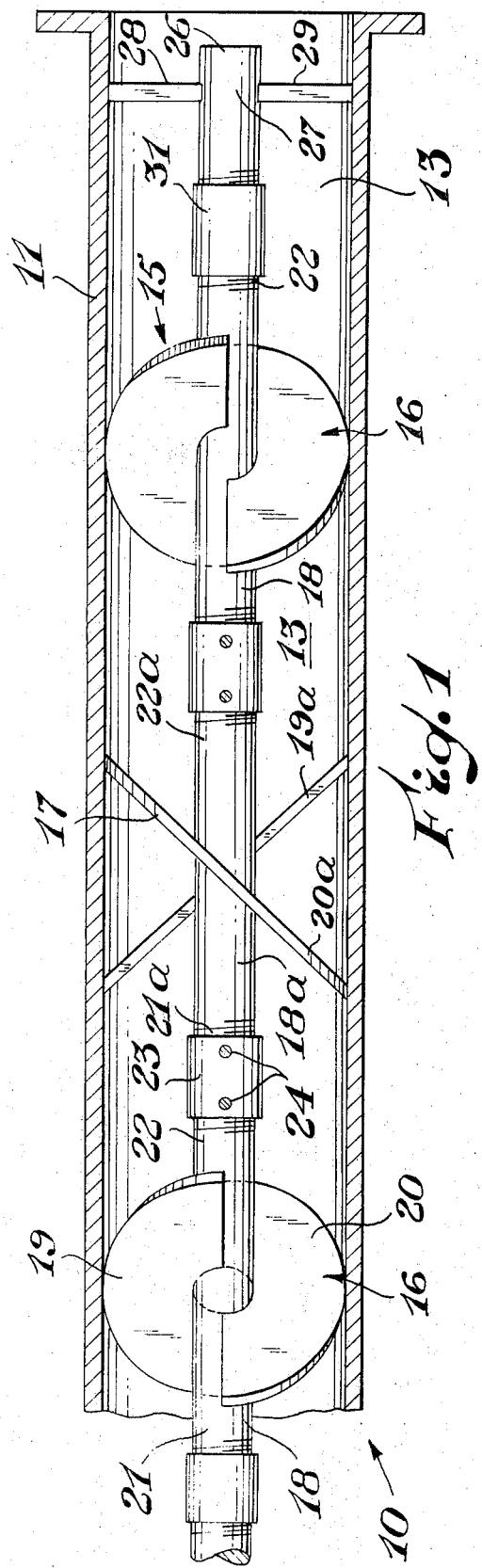
Fig. 1
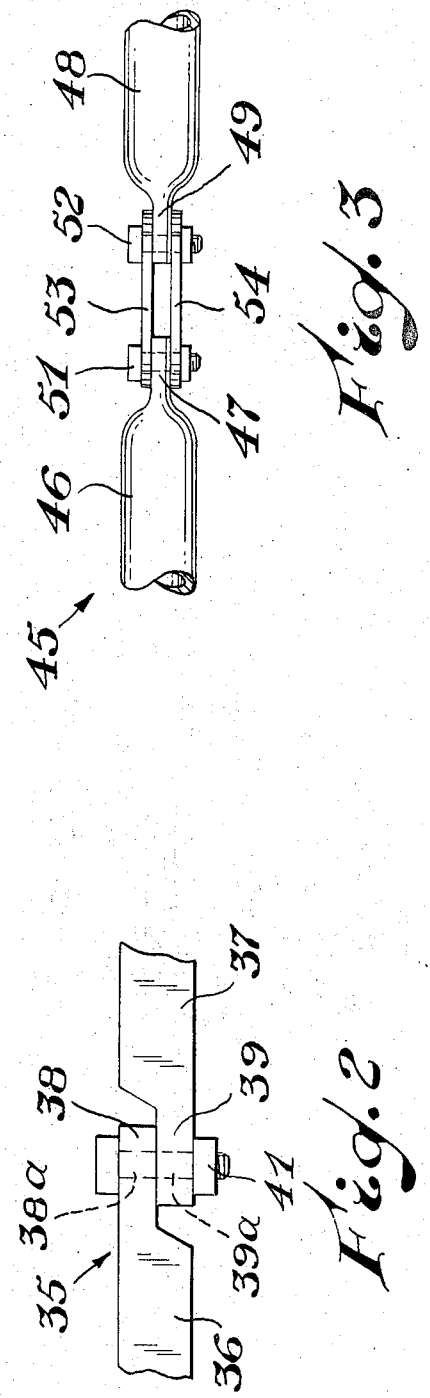
Fig. 3
Fig. 2

INTERFACIAL SURFACE GENERATOR

Interfacial surface generators are well known in the art and are available in a variety of forms. Some interfacial surface generators are made up of a number of elements which are positioned within a conduit and maintained in position by a suitable shoulder or other aligning means. Some of such interfacial surface generators are shown in U.S. Pat. No. 3,051,452; 3,051,453; 3,195,865 and 3,239,197. Other interfacial surface generators are continuous elongate elements and are typified by those shown in U.S. Pat. No. 3,239,197; 3,286,992; 3,394,924 and 3,652,061. The teachings of the hereinbefore delineated patents are herewith incorporated by reference thereto. A particularly advantageous interfacial surface generator is shown in U.S. Pat. No. 3,652,061. For many purposes such a generator is highly desirable because of its ease of fabrication, ready replacement and is readily fabricated from easily available components. However, oftentimes it is desirable to install such an interfacial surface generator in existing equipment and oftentimes it is difficult to insert a baffle assembly such as depicted in FIG. 4 of U.S. Pat. No. 3,652,061 into a desired line because of lack of space and the handling difficulty of such elongate members in confined quarters.

It would be desirable if there were available improved interfacial surface generator baffles which could be installed within a conduit with minimal difficulty.

It would also be desirable if there were available an improved interfacial surface generator baffle assembly which is readily installed in existing lines.

It would further be desirable if there were available improved interfacial surface generator baffles which could readily be installed and fixed within a line.

These benefits and other advantages in accordance with the present invention are achieved in an interfacial surface generator which comprises a plurality of flow dividing and diverting elements, the elements being adapted to be inserted within a conduit and provide division and re-arrangement of a stream flowing therein to provide increased interfacial area between stream components, each of the elements being supported by at least one support means, the improvement which comprises providing a demountable joint between at least some of the adjacent elements.

Further features and advantages of the present invention will become more apparent from the following specification taken in connection with the drawing wherein:

FIG. 1 is a schematic partly cutaway representation of one embodiment of the invention.

FIGS. 2 and 3 schematically depict alternate demountable connections between mixing elements.

In FIG. 1 there is schematically represented an interfacial surface generator in accordance with the present invention generally designated by the reference numeral 10. The generator 10 comprises in cooperative combination a conduit 11 having defined therein an inner longitudinal passageway 13, the passageway 13 extending the length of the conduit. Disposed within the conduit 13 is an interfacial surface generator generally designated by the reference numeral 15. The generator 15 is an improvement on the embodiment depicted in FIG. 4 of U.S. Pat. No. 3,652,061. The generator 10 comprises a plurality of mixing elements 16, the elements 16 being separated by elements 17. As depicted in FIG. 1, the elements or baffles 16 comprise first and second plate-like elements or flow dividing and directing means 19 and 20 supported by an elongate support or body member 18, the body member 18 having a first end 21 and a second end 22. The body member 18 is generally axially disposed within the conduit 11. The element 17 is generally identical to the elements 16 but is a mirror image thereof. Thus the elements 16 and 17 may be arbitrarily designated as right-hand and left-hand elements, respectively. Similar parts of the element 17 are designated by the reference numerals having the suffix "a." The plate-like elements 19 and 20 are disposed in planes generally normal to each other as are the plate-like elements 19a and 20a. As shown in FIG. 1, the elements 16 can be considered coplanar while the element 17 is rotated about 90°. The ends 21 and 22 of adjacent elements 16 and 17 are joined by a demountable connector 23. The connector 23 as depicted in FIG. 1 is a threaded coupling engaging the threaded ends 22 and 21a of adjacent elements 16 and 17. Locking means 24 are disposed within the coupling 23 and serve to fix the relative position of the adjacent elements 16 and 17 and prevent relative rotation. Beneficially, the locking means 24 are set screws, or alternately, pins. Other locking means are readily employed such as tack welding, settable adhesives or the like. An anchor means 26 is positioned in the right-hand of the conduit 11. The anchor means comprises an axially disposed support member 27 having radially extending arms 28 and 29 which are welded to the inner surface of the conduit 11. Alternately, the arms 28 and 29 may be affixed to a flange to removeably affix the baffles within a conduit. The axially extending member 27 threadably engages a coupling 31 which in turn threadably engages a threaded end 22 of the adjacent element 16.

Beneficially, the arrangement as depicted in FIG. 1 is readily assembled either within the conduit or at an end of the conduit, and as additional elements are added to the interfacial surface generator they are forced within the conduit until the desired number of baffles or mixing stages have been added, and optionally the assembly anchored or affixed to the conduit if necessary.

In FIG. 2 there is depicted an alternate connection designated by the reference numeral 35 useful for the practice of the present invention. The connection 35 comprises a first support member 36 and a second support member 37 beneficially of hollow tubular construction having flattened ends 38 and 39, respectively. The flattened ends 38 and 39 overlap, each end defining a pin passageway 38a and 39a, respectively, the pin passageways having disposed therein a pivot pin 41. Beneficially, the pivot pin 41 may be threadable with a nut, cotter pin or the like, depending on the particular and desired application.

Beneficially the joint of FIG. 2 permits assembly of the interfacial surface generator elements external to the conduit and permits rotation about the pivot pin to a limited degree providing an aid in assembling the generator and passing the assembled generator into the conduit and is particularly beneficial when it is desired to locate such a generator in a pipe bend.

An alternate embodiment of joint is depicted in FIG. 3 and is designated by the reference numeral 45. The joint 45 comprises a first baffle or mixing element body portion 46 having a terminal end 47 and a second body portion 48 having a terminal body portion 49. Each of the terminal portions 47 and 49 define parallel pin passageways, not shown. The terminal portions 47 and 49 have disposed therein pivot pins 51 and 52, respectively. The pivot pins 51 and 52 are in turn joined by links 53 and 54. The links 53 and 54 can rotate to at least a limited degree in a plane normal to the plane of the illustration about both pins 51 and 52 and provide a substantially greater degree of rotation than is conveniently obtained by the embodiment of FIG. 2. By using links such as the links 53 and 54 of varying lengths, the spacing of the mixing elements is readily obtained.

The embodiment of FIG. 3 is particularly advantageous in instances where shop assembly of the mixing elements or baffles is desired and in instances where the baffle assembly must be positioned in or pass through an elbow.

As is apparent from the foregoing specification, the present invention is susceptible of being embodied with various alterations and modifications which may differ particularly from those that have been described in the preceding specification and description, For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. In an interfacial surface generator which comprises a plurality of flow dividing and diverting elements, the elements being adapted to be inserted within a conduit and provide diversion and re-arrangement of a stream flowing therein to provide increased interfacial area between stream components, each of the elements being supported by at least one support means, the improvement which comprises
   providing a demountable joint between at least some of the adjacent elements, wherein the demountable joint is a threaded coupling which threadably engages terminal portions of the dividing and diverting elements.

2. In an interfacial surface generator which comprises a plurality of flow dividing and diverting elements, the elements being adapted to be inserted within a conduit and provide diversion and re-arrangement of a stream flowing therein to provide increased interfacial area between stream components, each of the elements being supported by at least one support means, the improvement which comprises
   providing a demountable joint between at least some of the adjacent elements, wherein the demountable joint comprises a pin passing through portions of adjacent dividing and diverting elements.

3. The generator of claim 2 wherein the demountable joint comprises at least one link extending between adjacent dividing and diverting elements.

* * * * *